(12) United States Patent
Lehto

(10) Patent No.: US 6,374,507 B1
(45) Date of Patent: Apr. 23, 2002

(54) ALIGNMENT TOOL

(76) Inventor: Rick A. Lehto, 39069 Hwy. 228, Sweet Home, OR (US) 97386

( * ) Notice: Subject to any disclaimer, the term of this patent is extended or adjusted under 35 U.S.C. 154(b) by 0 days.

(21) Appl. No.: 09/489,259

(22) Filed: Jan. 21, 2000

(51) Int. Cl.⁷ .............................................. G01C 15/00
(52) U.S. Cl. ........................................ 33/645; 33/286
(58) Field of Search .......................... 33/645, 286, 412, 33/529, 613, 533

(56) References Cited

U.S. PATENT DOCUMENTS

| | | | |
|---|---|---|---|
| 4,231,161 A | | 11/1980 | Belfiore ........................ 33/181 |
| 4,249,294 A | | 2/1981 | Belfiore ........................ 29/271 |
| 4,889,425 A | * | 12/1989 | Edwards et al. ............. 356/152 |
| 5,015,056 A | * | 5/1991 | Yamaguchi et al. ...... 350/96.15 |
| 5,052,687 A | * | 10/1991 | Katerba ....................... 116/173 |
| 5,077,905 A | * | 1/1992 | Muray, Jr. .................... 33/412 |
| 5,084,980 A | * | 2/1992 | Skopec et al. ................ 33/286 |
| 5,392,521 A | * | 2/1995 | Allen ........................... 33/293 |
| 5,738,595 A | * | 4/1998 | Carney ........................ 473/209 |
| 5,856,875 A | * | 1/1999 | Duey et al. .................. 356/400 |
| 5,987,762 A | | 11/1999 | Toth et al. ..................... 33/286 |
| 6,052,911 A | * | 4/2000 | Davis ........................... 33/286 |
| 6,098,297 A | * | 8/2000 | Belfiore ....................... 33/286 |
| 6,256,893 B1 | * | 7/2001 | Forborgen .................. 33/1 PT |

* cited by examiner

Primary Examiner—Diego Gutierrez
Assistant Examiner—G. Verbitsky
(74) Attorney, Agent, or Firm—Carl D. Crowell

(57) ABSTRACT

A component alignment tool for aligning pulleys or sprocket gears in a drive system. The tool comprising a body containing a laser, and a pair of adjustable clamping arms. The tool is affixed to one of a pair of components in the system to be aligned. The laser is then used to emit a light beam that is coplanar with the first component, directed at a second component. The targeting point of the laser is used to determine whether the two components are misaligned.

3 Claims, 4 Drawing Sheets

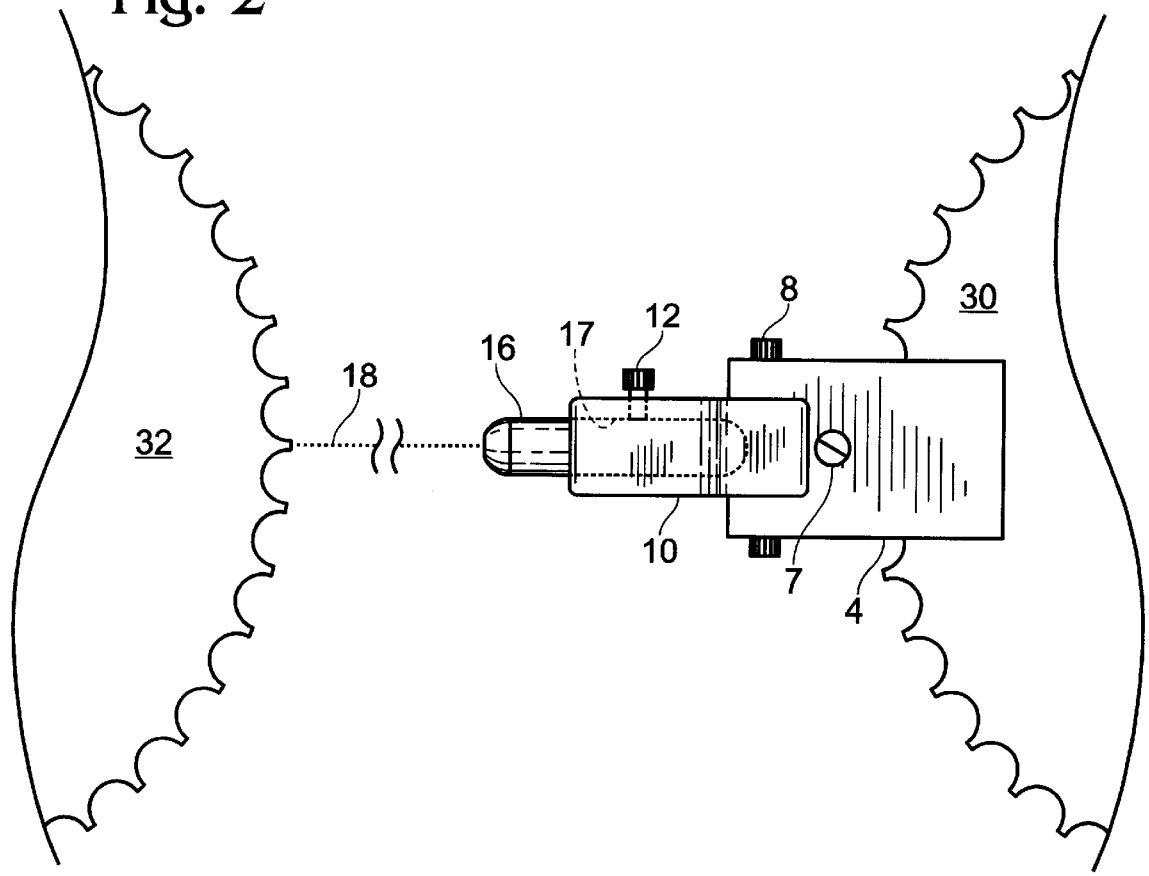
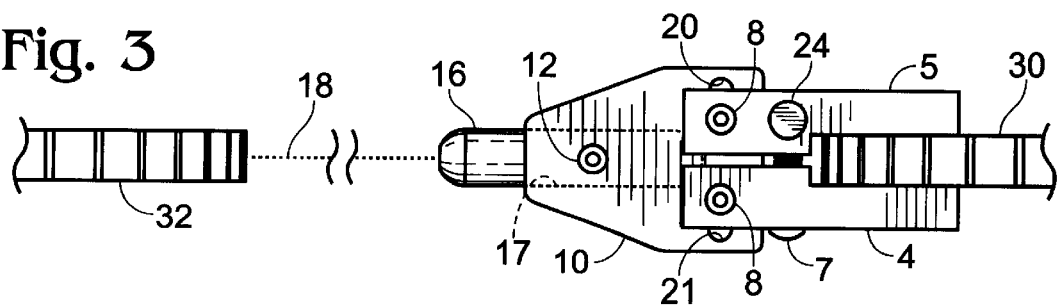
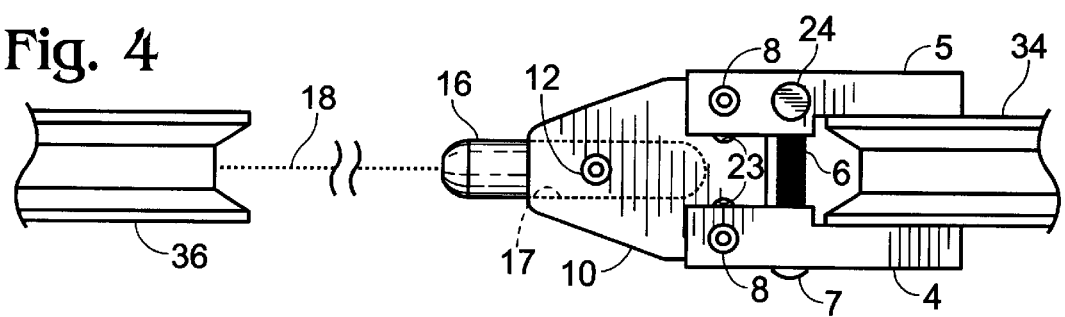

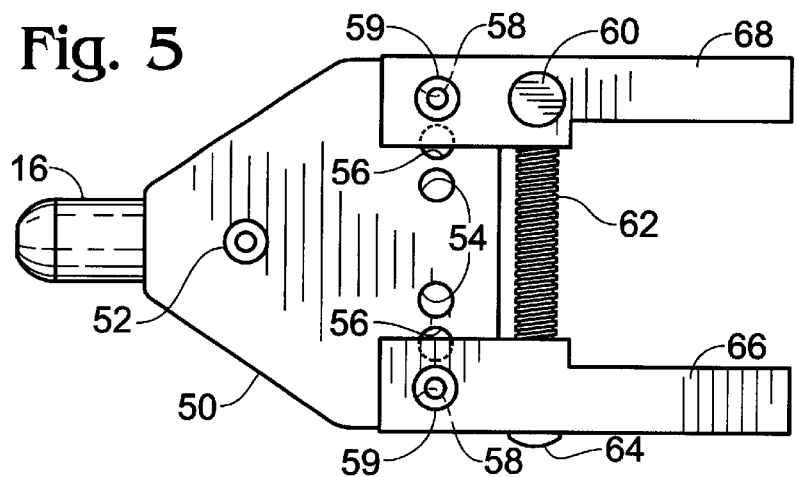
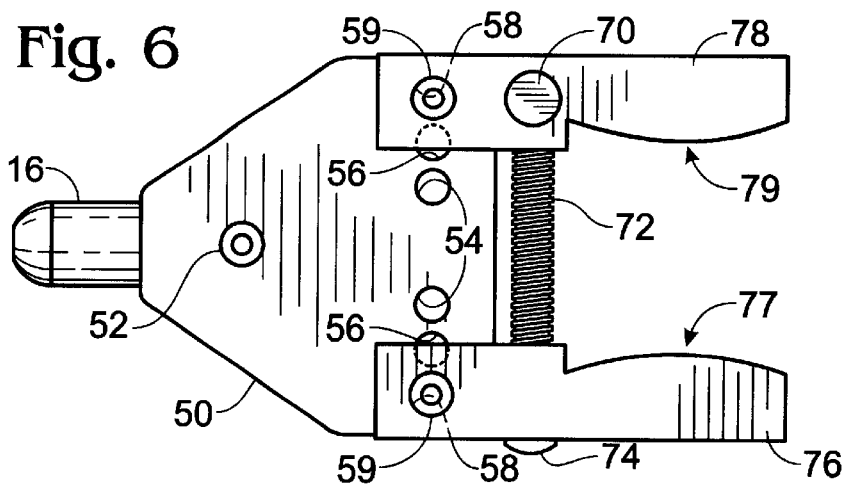
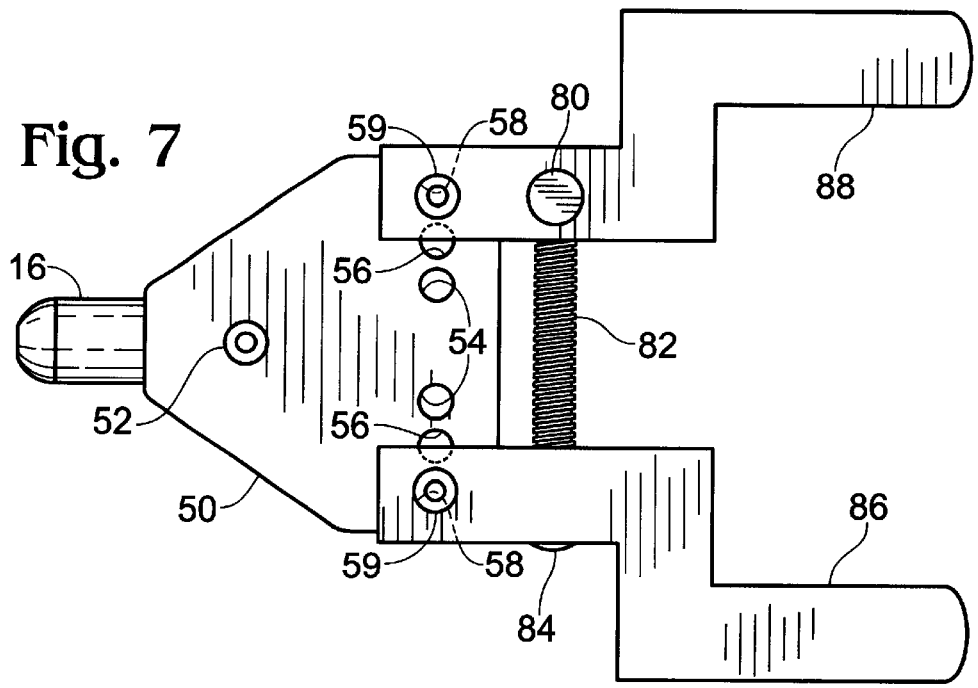

ALIGNMENT TOOL

BACKGROUND OF THE INVENTION

The present invention relates to devices for determining the of alignment between components of a system using cooperating pulleys, sprockets, or other components of the type.

Misalignment of components of a system of interrelated pulleys and or sprockets can result in vibration, noise, inefficient operation of components, excessive wear and ultimately premature failure of components.

In the past, alignment of a pulley or sprocket type system has been accomplished by the use of a cord line or straight edge to indicate center alignment. Measurements must be taken accurately at four points on the components; at the top, bottom and each side of the components. This method was less than satisfactory since it is time consuming, prone to inaccuracy, and unreliable because an adjustment of one alignment may cause the other alignments to change.

Recent innovations have dealt with methods of using optical devices, but these devices have been confined to limited application though complex targeting and mounting specific fittings that limit use to specific pulley or sprocket systems. When using targeting components, multiple devices must be properly installed, requiring additional components and adding time to any measurement taken.

Prior optical targeting devices have also been limited by the use of interchangeable mounts for use with specific pulleys. While mounts may be interchanged to allow use with various types of pulleys, this requires the maintenance of a number of custom pulley specific mounts to use the device on multiple pulleys as each unique pulley or sprocket requires a unique mount.

Another disadvantage to prior devices includes the need to remove the belt or other linking device between the two components to be measured to allow for placement and use of the prior devices.

SUMMARY OF THE INVENTION

The present invention pertains to a tool for temporarily affixing a laser to one component of a cooperating pair or series of components. The tool when affixed to a component may then be used to direct a laser beam to a cooperating component to determine whether the cooperating components coexist on the same plane as the first component for determination of component alignment.

In a preferred embodiment the tool includes a body unit in which is housed a laser. Attached to the body are two adjustable clamping arms, which are used to affix the body to a sprocket or pulley type component. When affixed to a component the laser will emit a beam that is coplanar with the medial plane of the component to which it is affixed. By rotating the first component the beam may then be directed to one or more additional components to determine whether the remaining components are coplanar with the beam emitted.

An advantage of the invention is the adjustability of the two clamping arms. The two arms are adjustable to accommodate a wide range of sizes of pulleys and sprockets. The arms are pivotally affixed to the body at one or more paired points. The body of the tool in some embodiments has multiple paired attachment points for setting the arms at varying widths. Each pair of attachment points is equidistant from medial line of the tool as defined by the beam created by the laser. The arms may be set to a wider set of points on the main body for placement on a wider component, or set to a narrower set of points for placement on a thinner component. Means of adjusting the width of the points at which the arms are affixed to the body include bore holes with set pins and a set of paired dogs on a slide set into the main body for each arm clamp to be set to, allowing for a quick ratcheting of the clamping arms to a variety of widths on a single unit.

A threaded screw or similar means for adjusting the width between the arms connects the two adjustable arms, which allows for the two arms to be quickly clamped together in a parallel relation on the component to be tested.

Another embodiment of the invention consists of having interchangeable modified clamping arms to accommodate pulleys or sprockets wider than that to which the basic unit may optimally be affixed. While the basic preferred embodiment has a wide range of widths, for optimal performance on wider pulleys, the wide base arms may be affixed to the body extending the utility of the body and the invention.

Other embodiments also include modified arms with arched inner faces that allow for a truer attachment when clamping the tool to certain components.

An advantage of the invention is that alignment of any length of span may be made.

Another advantage is that the setting of the clamps to a component is quick and easy allowing for a measure of alignment in a relatively short period of time.

Another advantage is that once affixed to the component, the device is securely attached and may be affixed and used at any angle, including while inverted.

Another advantage is that the linking device between the two components need not be removed for use in that the device may be quickly applied and re-applied at multiple points.

Yet another advantage is the versatility of the tool in it's application to a wide variety of component widths and types.

BRIEF DESCRIPTION OF THE DRAWINGS

FIG. 2 is a side view of the invention depicted in FIG. 1, attached a sprocket component of a multi-component drive system.

FIG. 3 is a top view of the assembly depicted in FIG. 2.

FIG. 4 is a top view of an alternate configuration of the invention depicted in FIG. 1 as applied to a pulley component of a multi-component drive system.

FIG. 5 is a top view of an alternate embodiment of the invention depicting multiple paired arm attachment points.

FIGS. 6 & 7 are top views of an embodiment of the invention in FIG. 5, depicting alternate arm forms.

DETAILED DESCRIPTION

Figure 1:
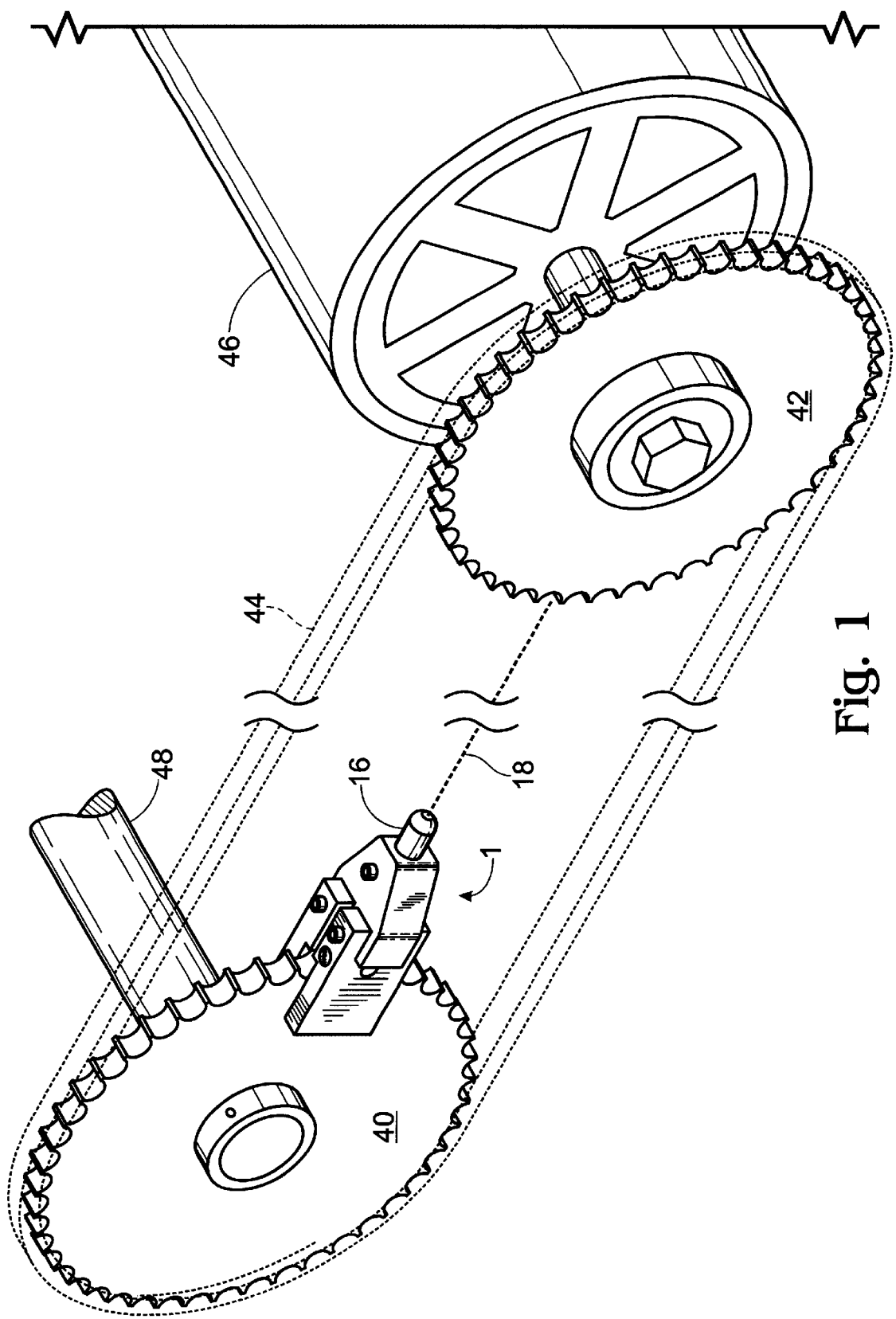
FIG. 1 is a perspective view of the tool, in use according to the present invention, attached to a sprocket component of a multi-component drive system.

Referring to the drawings with additional detail, in which the like numerals indicate like parts throughout the views presented, FIG. 1 illustrates the invention in its general preferred embodiment as applied in a multi-component system. The tool 1 is affixed to a sprocket component 40 mounted to a driven shaft 48 in such a manner as the laser 16 emits a beam 18 that is co-planer with the sprocket 40. The beam 18 is directed to the second sprocket component 42 which is mounted to a driving motor 46. The first sprocket component 40 may then be adjusted so that the beam 18 indicates that the first component 40 and the second component 42 are in alignment and co-planar.

FIG. 2 is a side view of the invention depicted in FIG. 1. The invention is affixed to a first component 30 with the tightening of the clamping arms 4 by adjusting the screw head 7. When affixed to the first component 30, the arms 4 hold the invention to the first component 30 by way of opposably clamping by lateral compression against the sides of the first component 30. This permits the use of the invention on items such as sprockets or saw blades which do not present a smooth face for such a device to be clamped to, or other components that do not have lip or ridge around the mounting face. Once attached, the laser 16 emits a beam 18 to a second sprocket component 32. The arms 4 are individually and pivotally attached to the body 10 by pins or screws 8. The body 10 contains a bore at 17 for receiving a laser 16. The laser 16 in a preferred embodiment of the invention is one such as is readily available and is a self contained unit including an internal battery power source (not shown) and a push button on-off switch (not shown). The body 10 is set with a knurled screw 12 or similar means for activating the laser 16 by engaging the on-off switch (not shown) of the laser 16.

FIG. 3 depicts a top view of the invention depicted in FIG. 2 as applied to a first sprocket component 30 with the laser 16 directing a beam 18 to a second sprocket component 32. Set in the body 10 are a set of two inner bores which are equidistant from the medial line of the laser 16 and beam 18. The bores are parallel and set for receiving pins 8 used to rotatably or pivotally attach a pair of arms 4, 5 to the body 10. A second set of similar bores 20, 21, equidistant from the medial plane of the beam 18 emitted by the laser 16 are also set in the body 10 spaced to receive the pins 8 in an alternate configuration as depicted in FIG. 4.

FIG. 4 depicts a top view of the invention of FIGS. 2 & 3 as applied to a first pulley component 34 with the laser 16 directing a beam 18 to a second pulley component 36. FIG. 4 also depicts the alternate configuration of the invention depicted in FIG. 3 with the pins 8 rotatably affixing the arms 4,5 to the body 10 at the outer pair of bore holes 21, 22.

The arms 4, 5 are reflective images of each other. In the preferred embodiment a first arm 5 is set with a rotating pin 24 that rotates freely within the arm and is medially threaded transverse to the axis of the pin 24 as shown in FIGS. 3 & 4 to receive the screw 6 which is used to clamp the two arms 4, 5 together. Both arms 4, 5 are bored to allow the screw 6 to be freely inserted, with the head of the screw 7 setting against one arm 4 for resistance and the shaft of the screw 7 threaded into the pin 24. The arms 4, 5 may then be readily clamped together and affixing the body 10 and laser 16 to a sprocket as depicted in FIG. 3 or pulley as depicted in FIG. 4.

FIG. 5 depicts an alternate embodiment of the invention showing the body 50 of the invention set with three pair of bore holes or attachment points, 54,56,58. Each of the three pair of attachment points, the inner pair 54, the middle pair 56 and the outer pair 58, are all parallel and equidistant from the medial plane of the body 50 as defined by the beam (not shown) emitted by the laser 16 when the laser 16 is activated by the switch 52.

As depicted in FIG. 5, arms 66,68 are affixed to the outer most pair of bore holes 58 with removable pins 59 which allow the arms 66, 68 to rotate in a single plane. In application of the invention the arms 66, 68 are placed on either side of a component. The screw with a shaft 62 and head 64 is placed so that the screw head 64 abuts a first arm 66. The body of the screw 62 freely penetrates the first arm 66 and traverses the space between the two arms 66, 68 engaging the pin 60 which is rotatably imbedded in the second arm 68. The screw head 64 may then be adjusted driving the screw body through the pin 60 bringing the arms 66, 68 closer together allowing the arms 66, 68 to engage a component to be measured.

As depicted in FIG. 6, the invention of FIG. 5 is fitted with an alternate arm form 76, 78. The arms 76, 78 are attached by removable pins 58. Each have a cylindrical-section arched face 77, 79, forming an arched plane. When the screw head 75 is turned, driving the screw body 72 into the rotating pin 70 the arms will close on a component to be measured. The arms 76, 78 will engage that component with a line on each face 77, 79 which is parallel and equidistant from the medial plane of the laser 16.

As depicted in FIG. 7 the invention of FIG. 5 is fitted with another alternate wide base arm from 86, 88 which has a similar screw head 84 and screw body 82 engaging a rotating pin 80 set into an arm 88. The advantage of the embodiment of FIG. 7 is that the body 50 and laser 16 of FIG. 5 may be used with a wide variety of arm forms as depicted in FIGS. 6 & 7. The arms 86, 88 of FIG. 7 being specially adapted to allow the body 50 and laser 16 to be used with components with extended widths. Replacement of the FIG. 5 arms 66, 69 may be accomplished with the removal of pin 59 and fitting of the wide set arms 86, 88 and resetting the pins 59.

Figure 8:
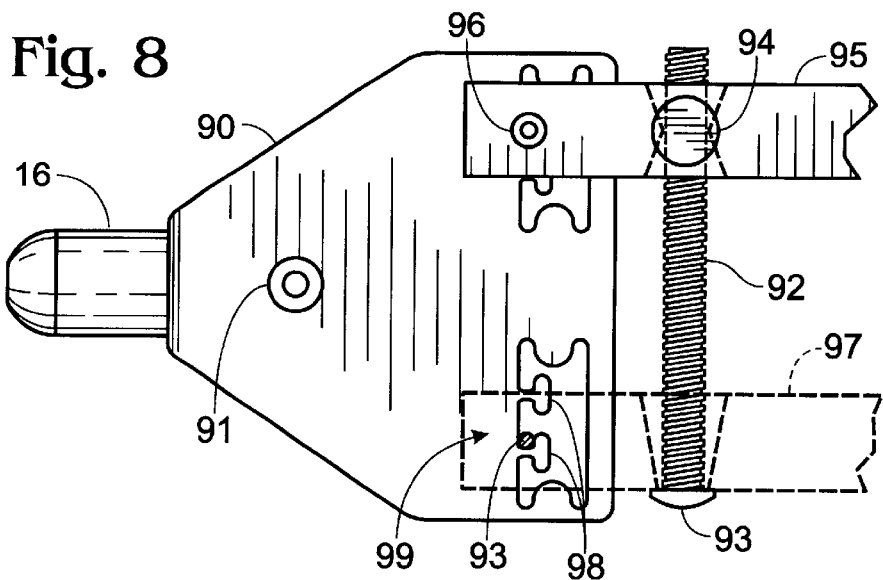
FIG. 8 is a top view of an alternate embodiment of the invention depicting the dog and slide assembly for adjusting arm width.

FIG. 8 depicts an alternate form of the body of FIGS. 5,6 & 7. In FIG. 8, the body 90 houses the laser 16 and switch 91. In place of the bore holes 54,56,58 depicted in FIGS. 5, 6 & 7 for receiving an arm attachment pin 59, an assembly of cleats 98 create a slide and cleat unit 99 which allow for the arms 95, 97 to be positioned at a variety of set widths by adjusting the setting of the arm 97 secured by a retaining pin 96, by setting the pin shaft 93 to a specific cleat 98.

Figure 9:
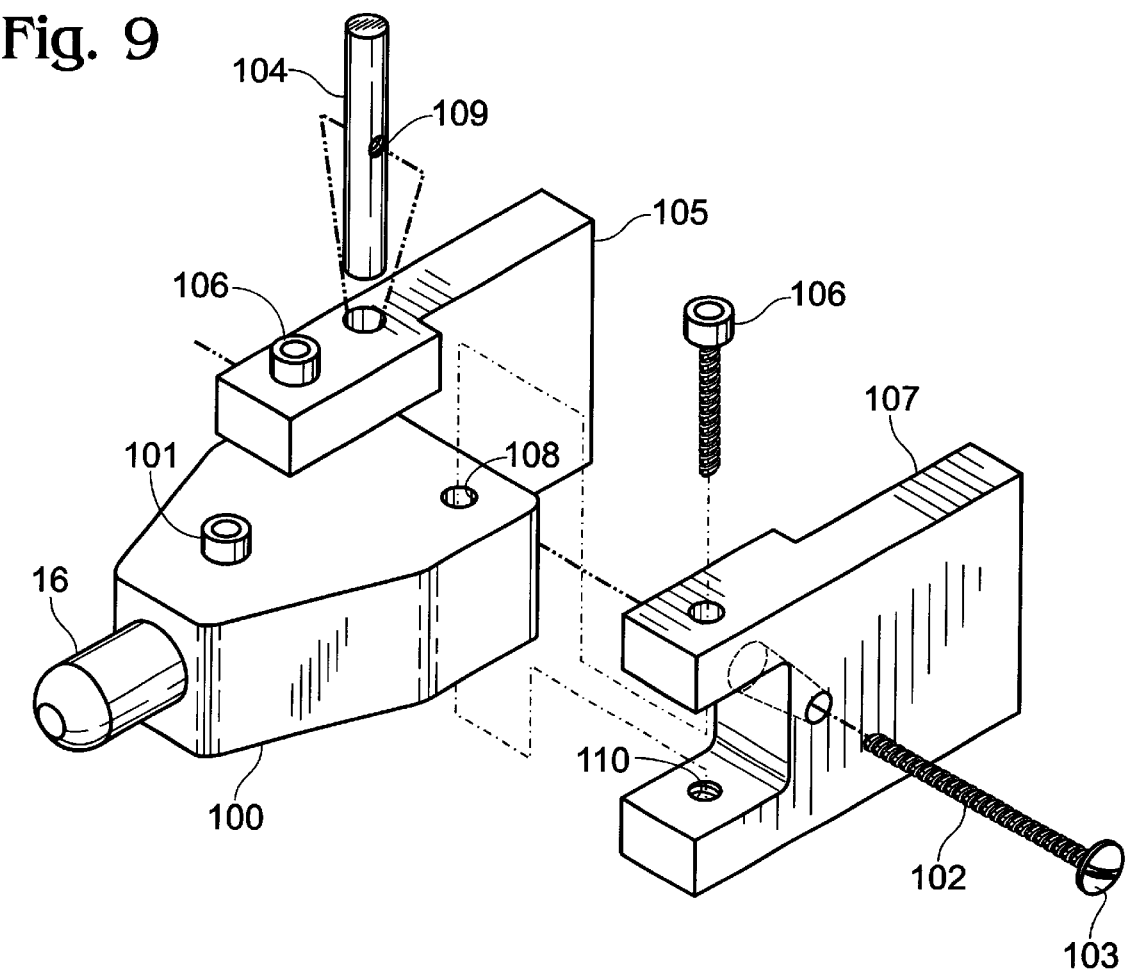
FIG. 9 is an exploded view of an alternate embodiment of the invention.

FIG. 9 depicts an embodiment of the invention exploded for ease of viewing the elements of the invention. The body 100, contains a laser 16, and is fitted with a switch 101. A pair of arms 105, 107 are attached to the body at a pair of parallel bore holes 108 with a set of screws 106, which allow the arms 105, 107 to freely rotate in a single plane, each screw engaging the lower portion of the arms 110. The clamping screw head 103 abuts a first arm 107 and traverses the space between the arms 105, 107 engaging a rotating shaft 104 set into a second arm 105 which has been threaded medially 109 for receiving the clamping screw shaft 102.

To those skilled in the art, other variations of this invention will be apparent, including changes and modifications. Such changes and modifications may be carried out without departing from the scope of this invention, which is intended to be limited only by the scope of the claims below.

I claim:

1. An alignment tool for use in aligning two components, the tool comprising;

a body with a pair of arm attachment points, a laser affixed to said body, a pair of opposably clamping arms individually and pivotally attached to said arm attachment points for opposably clamping to one of the components by lateral compression of the arms against the sides of said one component, and, a means for adjusting the width between said pair of arms.

2. The tool as set forth in claim 1 wherein each of said arms has a front face and a back side, where in said front face of each arm is convex for engaging one of said components.

3. The tool as set forth in claim 1 wherein said body further comprises more than one said pair of arm attachment points.

* * * * *